United States Patent [19]

Kerst et al.

[11] 3,764,677

[45] Oct. 9, 1973

[54] DIETHYL BETAAMINOETHYLPHOSPHONATE AS AN ANTIMICROBIAL AGENT

[75] Inventors: Al F. Kerst; John D. Douros, Jr., both of Littleton, Colo.

[73] Assignee: The Gates Rubber Company, Denver, Colo.

[22] Filed: June 25, 1971

[21] Appl. No.: 156,940

[52] U.S. Cl.......................... 424/211, 71/67, 71/86
[51] Int. Cl.............................................. A01n 9/36
[58] Field of Search..................................... 424/211

[56] References Cited
UNITED STATES PATENTS
3,312,623  4/1967  Fitch et al...................... 424/222 X

OTHER PUBLICATIONS

Chem. Abst. 48:2572i (1954)

Primary Examiner—Albert T. Meyers
Assistant Examiner—Leonard Schenkman
Attorney—Raymond Fink et al.

[57] ABSTRACT

Diethyl betaaminoethylphosphonate can be used to inhibit and/or prevent the growth of undesirable algae, bacteria, fungi, yeast, and other microorganisms. This invention is particularly concerned with the bacteriostatic and bactericidal properties of diethyl betaaminoethylphosphonate compounds against species of *Proteus*, *Salmonella*, *Shigella*, *Staphylococcus* and *Xanthomonas*.

43 Claims, No Drawings

DIETHYL BETAAMINOETHYLPHOSPHONATE AS AN ANTIMICROBIAL AGENT

BACKGROUND OF THE INVENTION

While there is no dearth of organophosphorous microbial growth inhibitors existing today, the antimicrobial properties of diethyl betaaminoethylphosphonate have not been previously discovered. Furthermore, few of the commercially available organophosphorous growth inhibitors offer diethyl betaaminoethylphosphonate's activity against such a broad spectrum of algae, bacteria, fungi, yeast, et cetera. This broad activity is often desirable since the inhibition of one microorganism species or group of species may create an imbalance which often results in the rampant growth of other deleterious microorganisms.

SUMMARY OF THE INVENTION

According to the present invention, it has been found that diethyl betaaminoethylphosphonate

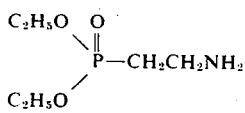

can be used effectively as an antimicrobial agent. The compound diethyl betaaminoethylphosphonate is well known and may be prepared according to the methods disclosed by A. W. Pudovik and G. M. Denisova, Zhur. Obshcewi Khim. 23,263-7(1953) and A. W. Pudovik, Dokiady Akad. Nauk S.S.S.R., 80,65-8(1951).

DESCRIPTION OF THE PREFERRED EMBODIMENTS

The following examples illustrate the antimicrobial qualities of diethyl betaaminoethylphosphonate and describe how these antimicrobial qualities may be utilized in various phases of agriculture, animal husbandry, pharmacology and water treatment technology.

EXAMPLE I — ANTIBACTERIAL AND ANTIYEAST ACTIVITY

The in vitro effectiveness of diethyl betaaminoethylphosphonate against bacteria and yeast species is established in the following manner. One loopful of each of the investigated bacteria or yeast is transferred from agar slants to 10 ml. of trypticase soy broth and incubated at 37° C. for 18 hours. At the end of this period, the bacteria or yeast is seeded into the same medium (1.5-2 percent agar) in which the original inoculum was prepared. The bacteria is then seeded at 1 ml. of inoculum per 250 ml. of medium, which is equivalent to at least $1 \times 10^6$ cells/ml as determined by dilution platecount or nephelometer readings vs. $BaCl_2$ Standards. The resultant mixtures are poured into heat-resistant sterile petri dishes at a temperature of 45° C. Analytical filter paper discs 1.2 cm. in diameter are used for the agar diffusion technique. Each disc is saturated with 0.08 ml. of the solubilized diethyl betaaminoethylphosphonate compound which has been diluted to equal 100 ug./disc and placed on the surface of the hardened agar. The plates are then incubated at 37° C. for 18 hours. The activity of the diethyl betaaminoethylphosphonate compounds is established by measuring the zone of inhibition in centimeters. Untreated control plates are used as a basis for comparison and these exhibit a profuse growth of bacteria. The results of these tests are as follows:

| Gram positive and Gram negative bacteria | Zone of Inhibition in Centimeters |
|---|---|
| Streptococcus hemolytic Group A | 1.0 |
| Streptococcus hemolytic Group B | 1.0 |
| Xanthomonas phaseoli ATCC No. 9563 | 2.9 |
| Staphylococcus aureus ATCC No. 209P | 1.6 |
| Escherichia coli ATCC No. 9637 | 2.6 |
| Erwinia carotovora ATCC 9653 | 2.9 |
| Shigella boydii ATCC No. 9212 | 3.4 |
| Shigella boydii ATCC No. 9905 | 3.2 |
| Shigella sonnei MMV 6654 | 3.4 |
| Shigella flexneri TYPE 6 MMV 760 | 3.2 H |
| Shigella flexneri TYPE 4 MMV 6625 | 3.2 H |
| Shigella dysenteriae TYPE 2 MMV 6673 | 3.2 |
| Salmonella sp. ATCC No. 9120 | 2.8 |
| Salmonella paratyphi ATCC No. 9281 | 2.5 |
| Salmonella enteritis ATCC No. 13076 | 2.9 H |
| Salmonella pullorum ATCC No. 10398 | 3.1 |
| Salmonella derby ATCC No. 6960 | 3.0 |
| Salmonella gallinarium ATCC No. 9184 | 3.1 |
| Salmonella typhimurium SR-11 | 2.8 |
| Salmonella typhosa ATCC No. 19403 | 2.9 |
| Neisseria gonorrhoeae ATCC No. 19424 | 4.0 |
| Neisseria intracellularis | 4.1 |
| Neisseria meningitides ATCC No. 13077 | 4.0 |
| Listeria monocytogenes ATCC No. 15813 | 0 |
| Vibrio fetus ATCC No. 15296 | 3.1 |
| Vibrio ATCC No. 14035 | 3.1 |
| Proteus vulgaris ATCC No. 9484 | 1.8 H |
| carotovora ATCC No. 495 | 2.5 |
| Mycobacterium butyricum ATCC No. 11314 | 1.7 |
| Mycobacterium fortuitum, Debos ATCC No. 4243 | 2.7 |
| Mycobacterium avium ATCC No. 19421 | 1.5 |
| Mycobacterium smegmatis ATCC No. 10143 | 1.5 |
| Mycobacterium phlei ATCC No. 11782, phage host | 2.1 |
| Micrococcus tetragena ATCC No. 10875 | 1.6 |
| Micrococcus melitensis 19399 | 1.5 |
| Micrococcus lysodeikticus ATCC No. 4698 | 1.6 |
| Corynebacterium diphtheriae ATCC No. 19409 | 1.7 |
| Corynebacterium haemolyticum | |

| | |
|---|---|
| ATCC No. 9345 | 1.7 |
| Diplococcus intracellularis Diplococcus pneumoniae ATCC No. 6303 | 1.0 1.0 |
| Hemophilus hemolyticus ATCC No. 10014 Hemophilus influenzae ATCC No. 19418 Hemophilus parainfluenzae ATCC No. 7901 Hemophilus suis ATCC No. 19417 Hemophilus vaginalis ATCC No. 14018 | 1.0 1.1 1.0 1.1 1.0 |
| Brucella abortus ATCC No. 4315 Brucella melitensis ATCC No. 19396 Brucella suis ATCC No. 4312 | 1.1 1.0 1.1 |

* Note H = hazy zone.

EXAMPLE II — SECONDARY SCREEN ANTIBACTERIAL ACTIVITY

To further define the scope of this invention, secondary screening tests using the techniques described in the primary screening tests are employed at a concentration of 1,000 ug/disc. The results of these secondary screens are as follows:

Compound: Diethyl betaaminoethyl-phosphonate   Concentration (1000 ug/disc)

| MICROORGANISM | |
|---|---|
| Salmonella sp. ATCC No. 9120 | 4.1 |
| Salmonella typhimurium miraglia SR-11 | 4.4 |
| Salmonella No. 45 MMU 1063 | 4.4 |
| Salmonella sp. MMU 6674 | 4.1 |
| Salmonella sp. MMU 6668 | 4.6 |
| Shigella boydii ATCC No. 9212 | 5.0 |
| Shigella boydii ATCC No. 9905 | 5.1 |
| Shigella flexneri Type 6 MMU 760 | 5.0 |
| Shigella flexneri Type 4 MMU 6625 | 5.1 |
| Shigella dysenteriae Type 2 MMU 6673 | 5.1 |
| Shigella sonnei MMU 6654 | 5.0 |
| Proteus vulgaris ATCC No. 9484 | 2.4 H |
| Proteus vulgaris ATCC No. 8427 | 2.6 H |
| Proteus vulgaris ATCC No. 4699 | 2.6 H |
| Proteus vulgaris ATCC No. 6896 | 2.5 H |
| Proteus vulgaris ATCC No. 9920 | 2.6 H |
| Proteus vulgaris ATCC No. 6897 | 2.5 H |
| Proteus vulgaris ATCC No. 12454 | 2.0 H |
| Proteus mirabilis ATCC No. 9961 | 2.3 |
| Proteus morganii G951 | 2.2 |
| Proteus mirabilis G912 | 2.2 |
| Proteus mirabilis K723 | 2.2 |

This data indicates that diethyl betaaminoethylphosphonate compounds can be used to inhibit many important types of diseases. For example, they can be used against:

| Bacteria | Disease Produced |
|---|---|
| Staphylococcus aureus | Major cause of bovine mastitis |
| Streptococcus faecalis | Bacterial endocarditis |
| Escherichia coli | Cause of scours and secondary cause of bovine mastitis |
| Proteus vulgaris | Major cause of fish disease (trout, pike) |
| Pseudomonas aeruginosa | Numerous animal and plant infections are caused by various pseudomonads. Urinary infections are notable examples. |
| Erwinia cartovora | Various species of Erwinia attack commercial crops of carrots, tobacco, potatoes, squash, et cetera. |
| Xanthomonas phaseoli | Various species of Xanthomonas cause a variety of diseases in plants such as sugar cane, rice, sugar beets, cotton, walnuts, wheat, rye, barley, beans, et cetera. |

The demonstrated antibacterial activity of diethyl betaaminoethylphosphonate compounds against *Staphylococcus aureus* and *Escherichia coli* is of particular interest to the field of pharamacology since the disclosed activity indicates that these compounds can be formulated as powders, salves, and ointments for administration in the treatment of burns and bacterially induced inflammations such as abscesses, dermatitis, rashes, and the like, particularly in domestic animals.

Although the precise mode of action whereby diethyl betaaminoethylphosphonate inhibits bacteria growth is not completely understood, it is believed that the diethyl betaaminoethylphosphonate compounds of this invention may serve as chemical antagonists; that is, as chemicals which compete with enzymes essential to the development of many bacteria. Since enzymes perform their catalytic function by virtue of their affinity for their natural substrate; any compound resembling a substrate in its chemically critical aspect may also have an affinity for the enzymes. If this affinity is great enough, the analog will displace the normal substrate from the enzyme and will prevent the growth reaction from taking place. It is believed that diethyl betaaminoethylphosphonate has a chemical affinity for an essential site on one enzyme necessary for bacterial growth and life.

The diethyl betaaminoethylphosphonate formulations of this invention can also contain other therapeutically valued supplements such as local anesthetics, irradiated oils, and other medicinal substances. When used for these or similar purposes, this compound may be incorporated in any therapeutically acceptable carrier such as oils, salves and ointments, together with adjuvants comprising surface active agents, detergents, dispersing agents, stabilizers and other modifiers which may facilitate the handling and application of the antibacterial material. In the case of the in vitro applications of the compositions of this invention, it is difficult to predict with precision what in all cases will constitute a therapeutic dose even on a weight basis. Variable factors such as type, duration and severity of infection and mode of administration may be determining factors fot the establishment of therapeutic doses.

Those skilled in the art will recognize that the above data indicates that the scope of this invention should not be limited to any particular disease species or to any particular type of animal or plant life. For example, the noted activity of diethyl betaaminoethylphosphonate against *Xanthomonas phaseoli* suggests that this compound will also prove to be of value against such other Xanthomonas species of *Xanthomonas transluscens*, *Xanthomonas juglandis Xanthomonas vesicatoria*, VI produces the following results at the diethyl betaaminoethylphosphonate concentration indicated:

| MICROORGANISM | Concentration (100 ug/disc) |
|---|---|
| Rhodotorula sp. Duke | 3.9 |
| Rhizopus stolonifer ATCC No. 10404 | 3.9 |
| Fusarium roseum UFCC 1166 | 3.0 |
| Fusarium oxysporum + cubense URCC 1122 | 2.2 |
| Scopulariossis sp. OU | 1.9 |
| Aspergillis niger SRI | 3.6 |
| Aspergillus niger | 3.7 |
| Aspergillus sydowi ATCC No. 1017 | 3.6 |
| Aspergillus nidulans ATCC No. 10074 | 3.9 |
| Aspergillus flavus ATCC No. 9643 | 3.9 |
| Aspergillus amstelodami ATCC No. 1001 | 4.1 |
| Aspergillus fumigatus | 4.2 |
| Cephalosporium acremonium ATCC No. 10141 | 4.0 |
| Cephalosporium sp. OU | 4.1 |
| Phoma pigmentovora ATCC No. 12569 | 4.0 |
| Paecilomyces varioti ATCC No. 1114 | 4.1 |
| Nigrospora sphaerica Penicillium rubrum ATCC No. 10520 | 4.2 |
| Penicillium notatum OU | 4.3 |
| Beauvaria bassiana MV 1341 | 4.1 |
| Beauvaria tenella MV 1919 | 4.2 |
| Torula bergeri OU | 4.2 |
| Monosporum apiospermum OU | 4.1 |
| Alternaria solani ATCC No. 639 | 3.4 H |
| Geotrichum sp. OU | 2.1 H |
| Verticillium albo-atrum ATCC No. 10833 | 3.9 |
| Trichophyton mentagrophytes ATCC No. 9129 | 4.3 |
| Trichophyton mentagrophytes ATCC No. 8215 | 4.1 |
| Trichophyton tonsurans ATCC No. 10217 | 4.2 |
| Cercospora beticola ATCC No. 12825 | 4.0 |
| Pythium arrhenomanes ATCC No. 12531 | 4.1 |
| Helminthosporium oryzae ATCC No. 11000 | 4.2 |

Comments: H = hazy
tr = trace

It will also be recognized by those skilled in the art that other protectant, systemtic and eradicant procedures may provide detection of other biological activities. Pathogens representative of *Phycomycetes, Ascomycetes, Basidiomycetes* and the *Fungi Imperfecti* may provide indices of other fungicidal activity. Additional pathogens and appropriate host organisms may well afford other opportunities to further define the degree and spectrum of the activity disclosed in this invention. Since no firm rules of procedure can be laid down for the sequence of such evaluations or for the choice of pathogens, diethyl betaaminoethylphosphonate must be considered on the basis of its demonstrated performance in such primary evaluations and then progressively judged in subsequent studies. A wide range of pathogens, representative of economically important diseases, can be used to help define this compound's biological activity and to assure high degrees of success under field conditons. The following disease organisms, crops and reference standards may be used in such evaluations:

| Disease | Disease Organism | Reference Compound |
|---|---|---|
| Powdery Mildew of Cucumbers | Erysiphe cichoracearum | Maneb, Karathane |
| Leaf Rust of Wheat | Puccinia rubigo-vera | Maneb, Karathane |
| Leaf Rust of Wheat | Puccinia rubigo-vera | Plantvax |
| Rice Blast Disease | Piricularia oryzae | Blasticidin |
| Downy Mildew of Sugar Beet | Peronospora schactii | Karathane |
| Downy Mildew of Lima Bean | Phytophthora phaseoli | Karathane |
| Bean Rust | Uromyces phaseoli var. typica | Maneb |
| Powdery Mildew of Wheat | Erysiphe graminis | Karathane |
| Powdery Mildew of Apple | Podosphaera leucotricha | Karathane |
| Powdery Mildew of Roses | Sphaerotheca pannosa var. rosae | Karathane |
| Powdery Mildew of Cantalope | Erysiphe cichoracearum | Karathane |
| Leaf Spot of Wheat | Helminthosporium sativum | Maneb |
| Early Blight of Tomato | Alternaria solani | Maneb |
| Rice Blast Disease | Piricularia oryzae | Blasticidin |
| Cercospora Leaf Spot of Sugar Beets | Cercospora beticola | Maneb |
| Septoria Leaf Spot of Celery | Septoria apii-graveolentis | Maneb |
| Apple Scab | Venturi inaequalis | Cyprex |
| Common Bacterial Blight of Bean | Xanthomonas phaseoli | Streptomycin Sulfate |

Wherever possible, the applicants recommend the use of "in vivo" procedures to test the active compound of this invention to demonstrate its efficacy under more realistic conditions. However, not all pathogens lend themselves to such techniques. In order to provide additional spectrum definitions, the following fruit-rotting, storage decay and bacterial pathogens may be tested by "in vitro" methods:

| | | |
|---|---|---|
| Brown Rot of Stone Fruits | Sclerotinia fructicola | Captan |
| Grey Mold of Fruit | Botryis cinerea | Maneb |
| Rhizopus Fruit and Vegetable Rot | Rhizopus nigricans | Maneb |
| Citrus Green Mold | Penicillium digitatum | Maneb |
| Citrus Blue Mold | Penicillium italicum | Karathane |
| Bacterial Disease of Many Fruit Crops | Pseudomonas syringae | Captan |
| Bacterial Soft Rot | Erwinia caratorora | Captan |

In their plant protection aspects, the diethyl betaaminoethylphosphonate compounds of this invention may be used in the manner known to the organophosphorus crop protection art; that is, they can be made up in solid or liquid formulations. Examples of solid formulations are dust, wettable powders, granules and pellets. As a dust, diethyl betaaminoethylphosphonate compounds may be dispersed in powdered solid carriers such as talc, soaps, soapstone, attalpulgus clay as well as other finely divided solids known to the

*Xanthomonas barbareae, Xanthomonas pelargonii, Xanthomonas alfalfae, Xanthomonas vasculorum*, et cetera. *Xanthomonas* species are known to cause diseases of tomatoes, sugar cane, rice, sugar beets, cotton, walnuts, wheat, rye, barley, and beans. Some of the more noteworthy *Xanthomonas* related diseases are *Xanthomonas vesicatoria* (Bacterial Leaf Spot of Tomatoes), *Xanthomonas phaseoli* (Common Bacterial Blight of Bean), *Xanthomonas vasculorum* (Gumming Disease of Sugar Cane) and *Xanthomonas malvacearum* (Bacterial Blight of Cotton).

The efficacy of diethyl betaaminoethylphosphonate under simulated field conditions is established by the following tests.

EXAMPLE III-INHIBITION OF XANTHOMONAS VESICATORIA (Bacterial Leaf Spot of Tomatoes)

A diethyl betaaminoethylphosphonate composition is prepared for spraying by dissolving it in a suitable solvent such as acetone, methyl alcohol or ethyl alcohol and then diluting the solution to the desired concentration with deionized water containing wetting and dispersing agents. Tomato seedlings, Bonny Best variety, in seven-leaf to eight-leaf growth stage, are mounted on a compound turntable and sprayed at 35 pounds pressure for 50 seconds with diethyl betaaminoethylphosphonate solutions at the concentration indicated below. After drying, treated plants are spray-inoculated at 30 pounds pressure with an aqueous cell suspension of *Xanthomonas vesicatoria* containing 5 per cent Carborundum and then immediately placed in an incubation chamber maintained at 70° F. and 95 per cent plus relative humidity. After 40 hours in the incubation chamber, the plants are removed to the greenhouse for further development of the infection. Disease severity is determined by counting the lesions present on six to seven treated leaves. The effectiveness of treatment is determined by direct comparison with inoculated controls. Streptomycin sulfate is used as a reference standard. The results of these tests are as follows:

| | |
|---|---|
| % Inhibition at 500 ppm: | 60% |
| % Inhibition at 1000 ppm: | 80% |
| Control (streptomycin sulfate) at 200 ppm: | 92% |

EXAMPLE IV-INHIBITION OF PHYTHOPTHORA INFESTANS (Late Blight of Tomatoes).

The efficacy of diethyl betaaminoethylphosphonate against *Phythopthora Infestans* (Late Blight of Tomatoes) is established in the following manner. Bonny Best tomato plants, Lycopersicon esculentum, approximately 5 to 6 weeks old, in five-leaf growth stage, are mounted on a compound turntable and sprayed at 30 pounds pressure with diethyl betaaminoethylphosphonate at the concentrations indicated below. The test compound is prepared for spraying by dissolving it in a suitable solvent (acetone, methyl alcohol, or ethyl alcohol) and diluting to desired concentrations with deionized water containing wetting and dispersing agents. After drying, treated plants are spray-inoculated with a mixed sporangial and zoospore suspension of *Phytopthora infestans* and immediately placed in an incubation chamber maintained at 70° F. and 95 percent relative humidity. After 40 hours in the incubation chamber, the plants are removed and observed for total infection lesions of the top three leaves. The effectiveness of treatments is determined by direct comparison with inoculated controls. Maneb is used as a reference standard. All units of test include a minimum of three replicates. The results of these tests are as follows.

| | |
|---|---|
| % Inhibition at 500 ppm: | 18% |
| % Inhibition at 1000 ppm: | 26% |
| Control (Maneb Inhibition) at 100 ppm: | 97% |

EXAMPLE V-ANTIFUNGAL ACTIVITY

The antifungal activity of this compound is established by treating *Fusarium oxysporum, Fusarium roseum Rhizopus nigricans, Rhizopus stolonifer, Aspergillus niger* and *Alternaria solani* test fungi in the following manner: One loopful of each of the tested viable fungi cultures, spores and mycelia is transferred from an agar slant to an 80 ml. portion of the nutrient broth composed of oatmeal agar, Czapeks, Sabouraud and deionized water to volume. The 80 ml. portion of the fungi and broth is 10 placed in a sterile shake flask (300 ml.) and the flask is placed on a rotary shaker for 96 to 120 hours at room temperature. At the end of this incubation time period, 10 ml. of the liquid are homogenized and placed in another sterile shake flask (300 ml.) containing 80 ml. of the above nutrient broth and 60 ppm of diethyl betaaminoethylphosphonate. The flasks are placed on a rotary shaker operating at 240 rpm at room temperature for 3 to 9 days. After this second incubation time, the flasks are taken off and examined for visible fungal growth and mycelial weights are determined. Untreated controls are used as the basis of comparison and these display profuse fungal growths containing species *Fusarium, Aspergillus* and *Alternaria*. The results of these tests indicate that diethyl betaaminoethylphosphonate imparts a substantial degree of inhibition of fungal growth at 60 ppm.

EXAMPLE VI - ANTIFUNGAL AND ANTIYEAST ACTIVITY

To further define the antifungal activity of this compound the seeded agar plates are prepared by transferring the cultures from slants washed with saline or phosphate buffers to the surface of hardened Sabouraud-Dextrose agar plates. Again as in in the case of Example I, the diethyl betaaminoethylphosphonate is tested by impregnating filter paper discs (1.27 cm. in diameter) with 0.08 rl. of the solubilized diethyl betaaminoethylphosphonate compounds so as to contain 100 ug/disc and placing them on the surface of the hardened agar. The plates are then incubated at 30° C. for 18 hours. The activity of this compound is established by measuring the zone of inhibition in centimeters. Untreated control plates are used as a basis for comparison and these exhibit a profuse fungal growth. The results of these tests are as follows:

| Microorganism | Zone of Inhibition in Centimeters |
|---|---|
| *Aspergillus niger* ATCC No. 1004 | 3.6 |
| *Alternaria solani* ATCC No. 6396 | 3.4 |
| *Rhizopus stolonifer* ATCC No. 10404 | 3.4 |
| *Fusarium oxysporum* UFCC 1122 | 2.2 |
| *Candida albicans* SRI 523 | 1.8 |

EXAMPLE VII — SECONDARY FUNGAL SCREEN

A secondary screen using the techniques of Example dusting art. When formulated as wettable powders, the active component may be employed in conjunction with inert fillers which may be of the clay type carrier or non-clay type, in conjunction with various combinations of wetting agents and emulsifiers which permit the adaptation of the concentration as a free-flowing powder for dispersion in the field.

Each of these carriers may in turn contain other carriers or extenders which are ordinarily non-reacting or inert substances such as sand, clays, talc, sawdust, alkaline earth carbonates, oxides, phosphates and the like as well as diatomaceous earth, micas or other suitable materials. When liquid formulations are desired, liquid extenders, dilutants or carriers of a non-reactive nature may be utilized. Examples of such materials are alcohols, ketones, glycols, aromatic hydrocarbons, petroleum fractions such as octane and various other distillates. From these considerations, it will also be recognized that the above formulations with slight modifications may be used in the field of animal husbandry as dusting powders and salves.

Where it is desired to use the aforementioned wettable powders or liquid formulations, either emulsified, dispersed or suspended in water or other fluids, one or more of the class of materials herein referred to as adjuvants can also be incorporated into the powder, dust or liquid formulation. These adjuvants comprise surface active agents, detergents, wettable agents, stabilizers, dispersing agents, suspending agents, emulsifying agents, spreaders, stickers and conditioning agents generally. To their modifying characteristics these adjuvants may facilitate handling and application and infrequently enhance or potentiate the diethyl betaaminoethylphosphonate compositions of this invention in their biological activities by mechanisms which are frequently not well understood. A satisfactory but not exhaustive list of these adjuvants appears in "Soap Chemical Specialties," Volume 31, No. 7, Page 61; No. 8, Pages 38–61; No. 9, Pages 52–67; and No. 10, Pages 38–67 (1955). See also, Bulletin No. 607 of the Bureau of Entomology and Plant Quarantine of the United States Department of Agriculture.

An additional advantage of diethyl betaaminoethylphosphonate is its compatibility with a variety of other bactericidal and fungicidal materials. For example, it may be convenient to combine this compound with one or more other adjuvants, carriers, pesticides, biocides or fungicides of various structures. For example, diethyl betaaminoethylphosphonate fungicidal inhibitors may be combined with insecti-cidal materials such as chlordane, benzene hexachlorides, DDT, DDD, the insecticidal carbamates, polychlorinated terpenes, parathions, methoxychlor, insecticidal phosphates, phosphorothioates, phosphorodithioates and with fungicides such as sulphur, quinones, dodecylgaunidine and metal dimethyldithiocarbamates.

There are many other considerations which may make some methods of application more favored than others. These considerations may include the type of organisms on which the compound is to be administered, the degree of activity, the degree of activity toward the particular organism, and side effects. Also to be considered is the cost of production and the characteristic solubility of diethyl betaaminoethylphosphonate in the carrier material.

The broad spectrum of antifungal activity afforded by this compound can also be utilized in the formulation of disinfectant solutions, paints, coatings, films and polymeric materials in order to protect against disease and rot caused by various fungi species. When used as a disinfectant, suitable formulations may be prepared by mixing the compound with an emulsifying agent in the presence of organic solvents and then diluting it with water to form an aqueous emulsion containing the diethyl betaaminoethylphosphonate. Suitable emulsifying agents include, e.g. alkylbenzenesulfonates, polyalkene glycols, et cetera. Aqueous emulsions of diethyl betaaminoethylphosphonate are particularly suited for use in disinfectant solutions used in washing hospital floors and walls. The following examples further illustrate the antifungal properties of diethyl betaaminoethylphosphonate.

EXAMPLE VIII — PREPARATION OF A VINYL COATING

RESISTANT TO MILDEW DETERIORATION

A vinyl coating is prepared using a commercially available preparation without the fungal growth inhibitor.

An identical vinyl coating is prepared except that 2 percent by weight of diethyl betaaminoethylphosphonate is incorporated into the coating formulation.

Two sets of components such as asbestos tubing, silk-wrapped transformers and rayon-wrapped solenoids are obtained. One set is sprayed with the vinyl coating containing inhibitor, the other with the identical coating without inhibitor.

EXAMPLE IX — PREPARATION OF PLASTICIZERS

RESISTANT TO MILDEW

A commercial thermoplastic monomer is divided into portions which are treated as follows.

Portion 1: To the first portion is added 2 percent by weight of diethyl betaaminoethylphosphonate and 10 percent by weight of dimethylnaphthalate as plasticizer. The monomer is polymerized and molded into 3-inch diameter discs, one-fourth inch in thickness prior to testing.

Portion 2: To this portion is added 2 percent by weight of diethyl betaaminoethylphosphonate and 10 percent by weight of butyl isodecylphthalate as plasticizer. The monomer is polymerized and molded as above.

Portion 3: This portion is the untreated control of Portion 1 containing no fungal inhibitor but 10 percent by weight of dimethylnaphthalate as plasticizer. Again, the polymerization and molding are identical.

Portion 4: This portion is the untreated control of Portion 2 containing no fungal inhibitor but 10 percent by weight of butyl isodecylphthalate as plasticizer. The polymerization and molding are described above.

The two plasticizers were chosen on the basis of their known susceptibility to Fusarium attack under high humidity and temperature conditions.

EXAMPLE X — TEST OF VINYL COATINGS AND PLASTICIZERS

FOR FUNGAL RESISTANCE

The vinyl coated articles and controls of Examples VIII, IX are placed in an air-tight high temperature and high humidity chamber maintained at 80° F. and 95 percent humidity to stimulate tropical temperature and humidity conditions. After a month's exposure the vinyl coated articles treated with diethyl betaaminoethylphosphonate inhibitor are only slightly attacked by rot while the articles not treated are well rotted. The two untreated control polymer discs are examined and found to be blackened and mildew rotted. Isolates of *Aspergillus, Fusarium* and known species of yeasts are prepared from the deteriorated discs. The discs containing the diethyl betaaminoethylphosphonate fungal inhibitor are not adversely affected.

EXAMPLE XI — ALGAECIDAL PROPERTIES OF DIETHYL-BETAAMINOETHYLPHOSPHONATE

The effectiveness of this compound against various algae species is established in the following manner. Algal cultures representing *Scenedesmus, Chlorella, Plectonema, Anacystis, Ankistrodesmus, Anabaena, Synura, Oscillatoria, Coccochloris, Chlamydomonas* and *Lyngbya* are each maintained in Chu No. 10 Broth Medium (Calcium nitrate, 0.040 grams; Potassium phosphate, 0.010 grams; Magnesium sulphate, 0.025 grams; Sodium carbonate, 0.020 grams; Sodium silicate, 0.025 grams; Ferric citrate, 0.003 grams; Citric acid, 0.003 grams; and deionized water; 1,000 ml.) in the presence of sunlight. Hardened Chu No. 10 agar plates are inoculated with swabs saturated with the respective algae broth cultures. The diethyl betaaminoethylphosphonate is tested by impregnating filter paper discs (1.27 cm. in diameter, No. 740-E, Schleicher and Schuell, Keene, New Hampshire) with a solution of the diethyl betaaminoethylphosphonate at the concentrations indicated. The saturated filter discs are placed on the surface of the seeded agar plates and the optimum growth temperature of 20° to 27° C. is maintained. Untreated control plates are used as a basis for comparison and these exhibited a profuse growth of algae. The results of these tests are expressed as inhibition zone diameters.

| Algae | Inhibition Zone (cm) for 92 ug/disc | Inhibition Zone (cm) for 30 ug/disc | Inhibition Zone (cm) for 9 ug/disc |
|---|---|---|---|
| *Scenedesmus basilensis* Taft EEC 83 | 6.0 | 2.9 | 1.1 |
| *Scenedesmus obliquus* Taft EEC 92 | 6.4 | 3.0 | 1.0 |
| *Scenedesmus obliquus* Taft EEC 92 | 6.2 | 2.11 | 1.1 H |
| *Chlorella vulgaris* ATCC No. 9765 | 4.0 | 2.4 | tr |
| *Chlorella ellipsoidea* Taft EEC-95 | 4.1 | 2.4 | tr |
| *Chlorella pyrenoidosa* Taft EEC-121 | 4.1 | 1.9 | tr |
| *Chlorella pyrenoidosa* ATCC 11469 | 4.0 | 2.1 | tr |
| *Plectonema notatum* Taft EEC 172 | 2.8 | tr | 0 |
| *Anacystis nidulans* Taft EEC 134 | 0 | 0 | 0 |
| *Ankistrodesmus* var. *acicularis* Taft EEC 28 | 0 | 0 | 0 |
| *Anabaena catenula* SRI EEC 315 | 4.2 | 3.0 | 1.1 |
| *Synura ulvella* UI | 6.1 | 5.4 | 4.0 |
| *Oscillatoria corneti* OU | 5.0 | 4.1 | 2.1 |
| *Coccochloris elebans* SRI | 4.3 | 2.4 | tr |
| *Chlamydomonas radiati* UA | 4.0 | 2.0 | tr |
| *Lyngbya* sp. Taft EEC 166 | 3.9 | 3.7 | 2.2 |

Comments: h = hazy zone
tr = trace

As was the case with the bacteria, it should be recognized that the scope of this invention should not be limited to any particular species. For instance, the algaecidal activity of this compound against *Chlorella vulgaris, Chlorella ellipsoidea* and *Chlorella pyrenoidosa* suggests that the compound will also prove to be of value against other species such as *Chlorella variegata*, et cetera. Similar possibilities exist for species of the other genera whose activity was shown to be arrested by this compound. It should be recognized also that other appropriate algae genera may well afford additional opportunities to further define the degree and spectrum of the algaecidal activity disclosed in this invention. Since no firm procedure can be laid down for the sequencing of such evaluations or for a selection among the more than 20,000 known algae species, the diethyl betaaminoethylphosphonate compounds of this invention must be considered on the basis of their demonstrated performance in these primary evaluations and then progressively judged in subsequent studies. These evaluations should include but not be limited to the following algae genera.

TASTE AND ODOR CAUSING ALGAE GENERA

| | | |
|---|---|---|
| Asterionella | Peridinium | Nitella |
| Anabaena | Mallomonas | Dinobryon |
| Microcystis | Aphanizomenon | Volvox |
| Uroglenopsis | Staurastrum | Pandorina |
| Hydrodictyon | Ceratium | Synura |
| Synedra | Coelosphaerium | |

CLEAN WATER ALGAE GENERA

| | | |
|---|---|---|
| Rhizoclonium | Merismopedia | Meridion |
| Pinnularia | Aphanothece | Chromulina |
| Cladophora | Ulothrix | Phacotus |
| Rhodomonas | Navicula | Staurastrum |
| Surirella | Chamaesiphon | Lemanea |
| Cyclotella | Micrasterias | Cocconeis |
| Chrysococcus | Calothrix | Microcoleus |
| Ankistrodesmus | | |

FILTER CLOGGING ALGAE GENERA

| | | |
|---|---|---|
| Anabaena | Closterium | Spirogyra |
| Chroococcus | Tabellaria | Trachelomonas |
| Dinobryon | Rivularia | Asterionella |
| Cymbella | Melosira | Palmella |
| Chlorella | Cyclotella | Diatoma |
| Synedra | Navicula | Fragilarai |
| Tribonema | Oscillatoria | |

POLLUTED WATER ALGAE GENERA

| | | |
|---|---|---|
| Arthrospira | Tetraedron | Anabaena |
| Merismopedia | Euglena | Phacus |
| Phormidium | Spirogyra | Gloeogapsa |
| Carteria | Chlorococcum | Stigeoclonium |
| Lepocinclis | Osillatoria | Gomphonema |
| Nitzschia | Lyngbya | Chlamydomonas |
| Chlamydobotrys | | |

SURFACE WATER ALGAE GENERA

| | | |
|---|---|---|
| Actinastrum | Euastrum | Zygnema |
| Nodularia | Gonium | Stauroneis |
| Coelastrum | Desmidium | Sphaerocystis |
| Euglena | Pediastrum | Scenedesmus |
| Micractinium | Eudorina | Oocystis |
| Mougeotia | Gomphosphaeria | |

RESERVOIR ALGAE GENERA

| | | |
|---|---|---|
| Chara | Audouinella | Compsopogon |
| Phormidium | Tetraspora | Bathrachospermum |
| Ulothrix | Achnanthes | Cymbella |
| Cladophora | Stigeoclonium | Bulbochaete |
| Gomphonema | Lyngbya | Draparnaldia |

The scope of this invention should encompass the use of this compound in waters of all types such as lakes, rivers, ponds, streams, reservoirs, swimming pools and oceans as well as recirculating industrial waters. These compounds can be used to prevent the initial occurrence of algae or they can be used on bodies of water with algae already blooming. The diethyl betaaminoethylphosphonate compounds of the present invention are also advantageous in that they are degradable with none of the degradation products being toxic to fish and most fish food organisms at algae killing concentrations.

Another important advantage of diethyl betaaminoethylphosphonate compounds in their algaecidal applications is that they can be made up in solid or liquid formulations. Examples of solid formulations are dust, wettable powders, granules and pellets. Solid formulations, particularly floating solid formulations, may be preferred in combating algae which grow on surface waters. As dusts, these compounds may be dispersed in powdered solid carriers such as talc, soap, soapstone, attapulgus clay, as well as other finely divided solids. When formulated as wettable powders, the active diethyl betaaminoethylphosphonate component may be employed in conjunction with inert fillers which may be of the clay type carrier or non-clay type in conjunction with various combinations of wetting agents and emulsifiers which permit adaptation as a free flowing powder. Each of these carriers may in turn be combined with other carriers which are ordinarily non-reacting or inert substances such as sand, clays, talc, sawdust, alkaline earth carbonates, oxides, phosphates and the like, as well as diatomaceous earth, micas or other suitable materials.

When liquid formulations are desired, liquid extenders or carriers of a non-reactive nature may be utilized. These compositions should contain approximately 0.1 to 20 percent by weight and preferably 0.1 to 3 percent and most preferably 0.5 to 2 percent of the active ingredient. Solvents which may be used in the preparation of such compositions would include alcohols, ketones, glycols, mineral spirits and aromatic solvents such as benzene, xylene, nitrobenzene, dimethylformide. Furthermore, to assist in the rapid and complete dispersion in water systems, these compositions may also contain approximately 5 to 30 percent by weight and preferably 10 to 15 percent by weight of surface-active agents. Suitable surface-active agents include sodium dialkyl sulphates, sodium alkylbenzene sulfonates, sodium carboxylates and the non-ionic surfactants such as ethoxylated fatty acid alcohols and amines.

Diethyl betaaminoethylphosphonate is compatible with a wide variety of other algaecidal, bactericidal and fungicidal materials. For example, it may be convenient to combine this compound with one or more of the other bactericides, fungicides or algaecides. For example, common fungicides and bactericides, such as sulphur, inorganic salts such as copper sulphate, activated colloidal silver compounds, copper naphthenate and zinc acetate, as well as substituted hydrocarbons and ammonium compounds, may be employed.

Other considerations may make some methods of application and use of this compound more favored than others. These considerations may include the type of organisms on which the compound is to be administered, the degree of activity, the degree of inhibition toward the algae organism and possible side effects. Also to be considered is the cost of production and the characteristic solubility of diethyl betaaminoethylphosphonate in the carrier compounds.

In their algaecidal aspects the applicants have discovered that diethyl betaaminoethylphosphonate compounds are active algaecides at relatively low concentrations. For example, it has been discovered that these compounds have algaecidal activity at concentrations as low as 0.1 ppm. The amount of diethyl betaaminoethylphosphonate added to the water will, of course, vary depending upon such factors as the type of algae present, the nature of the body of water, i.e., flowing stream versus small lake, et cetera, and the inherent ability of the body of water to support algae growth. This inherent ability in turn depends upon such factors as exposure to sunlight, pH, nutrient capabilities, and the like. In most cases, however, the concentration of this compound required to kill or inhibit growth of algaes will vary from 0.1 to 10 ppm, with the preferred amount being in the range of 0.8 to 5 ppm.

This compound can be added to the water according to conventional techniques for algaecide applications. When treating a lake or body of water which is relatively calm, the conventional procedure is to spray an aqueous solution of the algaecide over the surface of the water. The active ingredient generally will be pre-dissolved in the types of solvents previously mentioned. In the case of moving water, such as in water treatment plants or industrial facilities, the algaecide can be added to the water in small amounts at periodic intervals. For economic reasons, volume usages such as in lakes, streams, reservoirs, as distinguished from specialized uses such as in aquatic gardens, and industrial applications, the concentrations of the diethyl betaaminoethylphosphonate algaecides probably will not be more than 0.8 to 5 ppm of the water containing the algae.

Having thus disclosed our invention, we claim:

1. A method of killing or inhibiting the growth of microorganisms selected from the group consisting of fungi, Gram positive bacteria and Gram negative bacteria which comprises contacting said microorganisms with diethyl betaaminoethylphosphonate in an amount effective to kill or inhibit the growth of said microorganisms.

2. The method of claim 1 wherein the Gram positive bacteria are selected from the group consisting of *Staphylococci, Corynebacter, Micrococci, Myobacterium, Diplococci, Streptococci,* and *Xanthomonas.*

3. The method of claim 2 wherein the *Staphylococci* is *Staphylococcus aureus.*

4. The method of claim 2 wherein the *Corynebacter* are selected from the group consisting of *Corynebacterium diphtheriae* and *Corynebacterium haemolyticum.*

5. The method of claim 2 wherein the *Micrococci* are selected from the group consisting of *Micrococcus tetragena, Micrococcus melitensis* and *Micrococcus lysodeikticus.*

6. The method of claim 2 wherein the *Mycobacterium* are selected from the group consisting of *Myco-bacterium avium, Mycobacterium smegmatis, Mycobacterium phlei Mycobacterium fortuitum* and *Mycobacterium butyricum.*

7. The method of claim 2 wherein the *Diplococci* are selected from the group consisting of *Diplococcus intracellularis* and *Diplococcus pneumoniae*.

8. The method of claim 2 wherein the *Streptococci* are selected from the group consisting of *Streptococcus hemolytic*, group A, and *Streptococcus hemolytic*, group B.

9. The method of claim 2 wherein the *Xanthomonas* is *Xanthomonas phaseoli*.

10. The method of claim 1 wherein the Gram negative bacteria are selected from the group consisting of *Escherichia, Shigella, Salmonella, Vibrio, Neisseria, Hemophilus, Brucella, Proteus,* and *Erwinia*.

11. The method of claim 10 wherein the *Escherichia* is *Escherichia coli*.

12. The method of claim 10 wherein the *Shigella* are selected from the group consisting of *Shigella dysenteriae, Shigella sonnei, Shigella flexneri* and *Shigella boydii*.

13. The method of claim 10 wherein the *Salmonella* are selected from the group consisting of *Salmonella derby, Salmonella enteritis, Salmonella gallinarium, Salmonella paratyphi, Salmonella pullorum, Salmonella typhosa,* and *Salmonella typhimurium*.

14. The method of claim 10 wherein the *Vibrio* are selected from the group consisting of *Vibrio cholerea* and *Vibrio fetus*.

15. The method of claim 10 wherein the *Neisseria* are selected from the group consisting of *Neisseria gonorrhoeae, Neisseria intracellularis* and *Neisseria meningitides*.

16. The method of claim 10 wherein the *Hemophilus* are selected from the group consisting of *Hemophilus hemolyticus, Hemophilus influenzae, Hemophilus parainfluenzae, Hemophilus suis* and *Hemophilus vaginalis*.

17. The method of claim 10 wherein the *Brucella* are selected from the group consisting of *Brucella abortus, Brucella melitensis* and *Brucella suis*.

18. The method of claim 10 wherein the *Proteus* are selected from the group consisting of *Proteus vulgaris, Proteus morganni* and *Proteus mirabilis*.

19. The method of claim 10 wherein the *Erwinia* is *Erwinia carotovora*.

20. The method of claim 1 wherein the microorganisms are present on animals or plants and are contacted with an effective amount of diethyl betaaminoethylphosphonate together with an acceptable carrier.

21. The method of claim 1 wherein the fungi are selected from the group consisting of *Fusarium, Penicillium, Aspergillus, Alternaria, Rhizopus, Rhodotorula, Scopulariopsis, Cephalosporium, Phoma, Paecilomyces, Nigrospora, Absidia, Beauvaria, Torula, Monosporum, Geotrichum, Verticillium, Trichophyton, Cercospora, Pythium* and *Helminthosporium*

22. The method of claim 21 wherein the *Fusarium* is selected from the group consisting of *Fusarium roseum, Fusarium oxysporum,* and *Fusarium oxysporum cubense*.

23. The method of claim 21 wherein the *Penicillium* is selected from the group consisting of *Penicillium rubrum* and *Penicillium notatum*.

24. The method of claim 21 wherein the *Aspergillus* is selected from the group consisting of *Aspergillus niger, Aspergillus sydowi, Aspergillus nidulans, Aspergillus flavus, Aspergillus amstelodami* and *Aspergillus fumigatus*.

25. The method of claim 21 wherein the *Alternaria* is *Alternaria solani*.

26. The method of claim 21 wherein the *Rhizopus* is *Rhizopus stolonifer*.

27. The method of claim 21 wherein the *Rhodotorula* is *Rhodotorula* sp. Duke.

28. The method of claim 21 wherein the *Scopulariopsis* is *Scopulariopsis* sp. OU.

29. The method of claim 21 wherein the *Cephalosporium* is selected from the group consisting of *Cephalosporium acremonium* and *Cephalosporium* sp. OU.

30. The method of claim 21 wherein the *Phoma* is *Phoma pigmentovora*.

31. The method of claim 21 wherein the *Paecilomyces* is *Paecilomyces varioti*.

32. The method of claim 21 wherein the *Nigrospora* is *Nigrospora sphaerica*.

33. The method of claim 21 wherein the *Absidia* is *Absidia spinosa*.

34. The method of claim 21 wherein the *Mucor* is *Mucor racemosus*.

35. The method of claim 21 wherein the *Beauvaria* is selected from the group consisting of *Beauvaria bassiana* and *Beauvaria tenella*.

36. The method of claim 21 wherein the *Phialophora* is *Phialophora verrucosa*.

37. The method of claim 21 wherein the *Torula* is *Torula bergeri*.

38. The method of claim 21 wherein the *Monosporum* is *Monosporum apiospermum*.

39. The method of claim 21 wherein the *Verticillium* is *Verticillium albo-atrum*.

40. The method of claim 21 wherein the *Trichophyton* are selected from the group consisting of *Trichophyton mentagrophytes* and *Trichophyton tonsurans*.

41. The method of claim 21 wherein the *Cercospora* is *Cercospora beticola*.

42. The method of claim 21 wherein the *Pythium* is *Pythium arrhenomanes*.

43. The method of claim 21 wherein the *Helminthosporium* is *Helminthosporium oryzae*.

* * * * *